United States Patent [19]
Yamashita et al.

[11] Patent Number: 5,559,530
[45] Date of Patent: Sep. 24, 1996

[54] IMAGE DATA PROCESSING APPARATUS

[75] Inventors: Haruo Yamashita, Osaka; Masami Matsumiya, Higashiosaka; Tsumoru Fukushima, Katano, all of Japan

[73] Assignee: Matsushita Electric Industrial Co., Ltd., Osaka, Japan

[21] Appl. No.: 75,999

[22] Filed: Jun. 14, 1993

[30] Foreign Application Priority Data

Jun. 15, 1992 [JP] Japan ................... 4-154644

[51] Int. Cl.⁶ ................... G09G 5/36; G06K 9/56
[52] U.S. Cl. .................. 345/136; 345/23; 345/189; 382/205
[58] Field of Search ................. 345/23, 24, 25, 345/26, 132, 136, 137, 138, 149, 189, 190, 191, 192, 193, 194, 195, 196, 197, 199, 200, 203; 382/205, 206, 268, 269; 395/110, 150, 151

[56] References Cited

U.S. PATENT DOCUMENTS

| | | |
|---|---|---|
| 4,031,519 | 6/1977 | Findley . |
| 4,079,367 | 3/1978 | Yonezawa et al. . |
| 4,352,100 | 9/1982 | O'Connell . |
| 4,506,382 | 3/1985 | Huda et al. ................... 382/205 |
| 4,539,704 | 9/1985 | Pastor ................... 382/55 |
| 4,686,521 | 8/1987 | Beaven et al. ................... 345/23 |
| 4,780,711 | 10/1988 | Doumas ................... 345/137 |
| 4,808,984 | 2/1989 | Trueblood et al. ................... 345/189 |
| 4,827,251 | 5/1989 | Aoki et al. ................... 345/116 |
| 4,851,825 | 7/1989 | Naiman ................... 345/132 |
| 4,873,515 | 10/1989 | Dickson et al. ................... 345/136 |
| 4,908,780 | 3/1990 | Priem et al. ................... 345/136 |
| 4,952,921 | 8/1990 | Mosier ................... 345/137 |
| 5,264,838 | 11/1993 | Johnson et al. ................... 345/144 |
| 5,282,057 | 1/1994 | Mailloux ................... 358/445 |

*Primary Examiner*—Steven Saras
*Attorney, Agent, or Firm*—Ratner & Prestia

[57] ABSTRACT

An image data processing apparatus for generating a font with contour lines expressed with gradations comprises a font ROM for storing a binary font data. An output port is provided for reading a target pixel with ambient pixels arranged in 3×3 matrix of the binary font data stored in the font ROM. A shift register produces an address data based on the binary data read from the font ROM. A look-up table has $2^{3 \times 3}$ elements in which multilevel values in commensurate with the pixel patterns included the 3×3 matrix. One data of the multilevel data is output from the look-up table by designating one element by said address data, and is used as a gradation data of the target pixel. Thus, pixel of font can be expressed with a gradation, the jagged contour of the font is reduced.

1 Claim, 9 Drawing Sheets

| No. | PATERN | CONTENT 1 (D) | CONTENT 2 ||||
|---|---|---|---|---|---|---|
| | | | a | b | c | d |
| 0 | | 0 | 0 | 0 | 0 | 0 |
| 1 | | 0 | 0 | 0 | 0 | 0 |
| 2 | | 0 | 0 | 0 | 0 | 0 |
| ⋮ | ⋮ | ⋮ | ⋮ | ⋮ | ⋮ | ⋮ |
| 88 | | 7/8 | 1 | 1 | 1 | 1/2 |
| 89 | | 3/4 | 1 | 1/2 | 1 | 1/2 |
| 90 | | 3/4 | 1 | 3/4 | 1 | 1/4 |
| 91 | | 3/4 | 1 | 3/4 | 1 | 1/4 |
| 92 | | 7/8 | 1 | 1 | 1 | 1/2 |
| 93 | | 1 | 1 | 1 | 1 | 1 |
| 94 | | 7/8 | 1 | 1 | 1 | 1/2 |
| ⋮ | ⋮ | ⋮ | ⋮ | ⋮ | ⋮ | ⋮ |
| 329 | | 0 | 0 | 0 | 0 | 0 |
| 330 | | 0 | 0 | 0 | 0 | 0 |
| 331 | | 1/4 | 3/4 | 0 | 1/4 | 0 |
| 332 | | 0 | 0 | 0 | 0 | 0 |
| ⋮ | ⋮ | ⋮ | ⋮ | ⋮ | ⋮ | ⋮ |
| 488 | | 1/4 | 0 | 0 | 1/2 | 1/2 |
| 489 | | 3/8 | 1/4 | 0 | 3/4 | 1/2 |
| ⋮ | ⋮ | ⋮ | ⋮ | ⋮ | ⋮ | ⋮ |
| 510 | | 1 | 1 | 1 | 1 | 1 |
| 511 | | 1 | 1 | 1 | 1 | 1 |

$(\frac{1}{4})$ $(\frac{3}{8})$ $\begin{pmatrix} \frac{3}{4} & 0 \\ \frac{1}{4} & 0 \end{pmatrix}$ $\begin{pmatrix} \frac{1}{4} & 0 \\ \frac{3}{4} & \frac{1}{2} \end{pmatrix}$ (a)

(b)

IMAGE DATA PROCESSING APPARATUS

BACKGROUND OF THE INVENTION

1. Field of the Invention

The present invention relates to a process for producing attractive text images with improved smoothness in diagonal lines from character fonts and binary image data obtained by an image scanner or other image reading device. There is a broad range of applications for this process displaying fonts in a video display, video printers, text file display devices, facsimile display devices using liquid crystal displays, and other image display devices.

2. Description of the Prior Art

Laser beam printers and other extremely high resolution page printers offering resolutions of 400 dpi (dots per inch) and greater have become essential office equipment in the last few years as the technologies enabling hard-copy output of sharp, attractive text and graphics have become commonly available.

The text fonts used in these devices typically use bit-image fonts or vector (outline) fonts stored in a large capacity ROM. In a bit-image font each character is defined with an extremely large number of dots and the complete character set (font) is stored in the ROM. In vector fonts, each character is defined by vector coordinates and the characters can be scaled to the selected size by applying a mathematical algorithm to dynamically generate the bit image viewed on screen or paper. Extremely sharp, well-defined characters can be printed using a high resolution printer, and smooth contours can be obtained in virtually any font size using a scalable font. Scalable fonts have therefore become the mainstream in high resolution imaging devices.

The WYSIWYG (What You See Is What You Get) interface has also become the standard for personal computer user interface design, enabling the user to see the same image on screen and on the printed page. Advancing this WYSIWYG interface one step further, scalable fonts are gradually replacing bit image fonts in the processes used to generate on-screen displays.

When outputting text to a video display, however, it is difficult to achieve a text display with smooth diagonal lines in various font sizes because the resolution of even high resolution displays is a fraction of the resolution of a high resolution printer, and be necessity the characters are formed using fewer dots. As a result, scalability is the only characteristic of outline fonts that is currently used to generate on-screen text displays.

When displaying Chinese characters or Japanese kanji characters, the display is typically limited to 16–24 dots per character. This small number of dots makes it extremely difficult to display smooth characters free of jagged lines. It is difficult to display these characters smoothly even when using outline fonts because of the small number of dots, and the quality of the bit images generated from these outline fonts is lower than the quality of bit-mapped fonts manually designed to the same point size. The drawback to using bit-mapped fonts as semi-scalable fonts is that bit maps must be designed for each point size, and the memory capacity required to display large point sizes increases dramatically.

Whether using bit-mapped or outline fonts, however, it is not possible to display smooth contours with a line width smaller than the physical size of the display pixels, and high definition display of small point size characters is therefore not possible.

While methods of making these jagged diagonal lines less conspicuous by blurring text and images using a low-pass filter (LPF) or other band width limitation process have been proposed, these processes also blur horizontal and vertical lines in which there is no jaggedness. The result is an image or text display from which sharpness and definition have been blurred out.

SUMMARY OF THE INVENTION

The object of the present invention is therefore to provide an imaging device which solves these problems.

The present invention has been developed with a view to substantially solving the above described disadvantages and has for its essential object to provide an improved image data processing apparatus.

In order to achieve the aforementioned objective, an image data processing apparatus for generating multilevel data from binary font data formed by pixels each having binary level, said apparatus comprises data memory means for storing said binary font data; addressing means for setting a read address of said data memory means for reading 3×3 matrix of said binary font data stored therein sequentially; shift register means for shifting binary data sequentially read out from said 3×3 matrix, and outputting binary data having an $3^2$ bit numeric value; conversion table means having $2^{3 \times 3}$ elements addressed by said $3^2$ bit numeric value data from said register means to produce multilevel data of a target pixel of said 3×3 matrix of binary font data, said target pixel being located at the center of said 3×3 matrix; and output means for outputting said multilevel data as a new center pixel data to enhance the gradation of said binary font data.

BRIEF DESCRIPTION OF THE DRAWINGS

These and other objects and features of the present invention will become clear from the following description taken in conjunction with the preferred embodiments thereof with reference to the accompanying drawings throughout which like parts are designated by like reference numerals, and in which:

FIG. 8 is a group showing the contents of a look-up table according to the present invention, FIG. 8, FIGS. 10A, 10B, and 10C are graphs in assistance of explaining the method of determining each element, with respect to another example pattern of input character, in the look-up table shown FIG. 8.

DETAILED DESCRIPTION OF THE PREFERRED EMBODIMENTS

Figure 1:
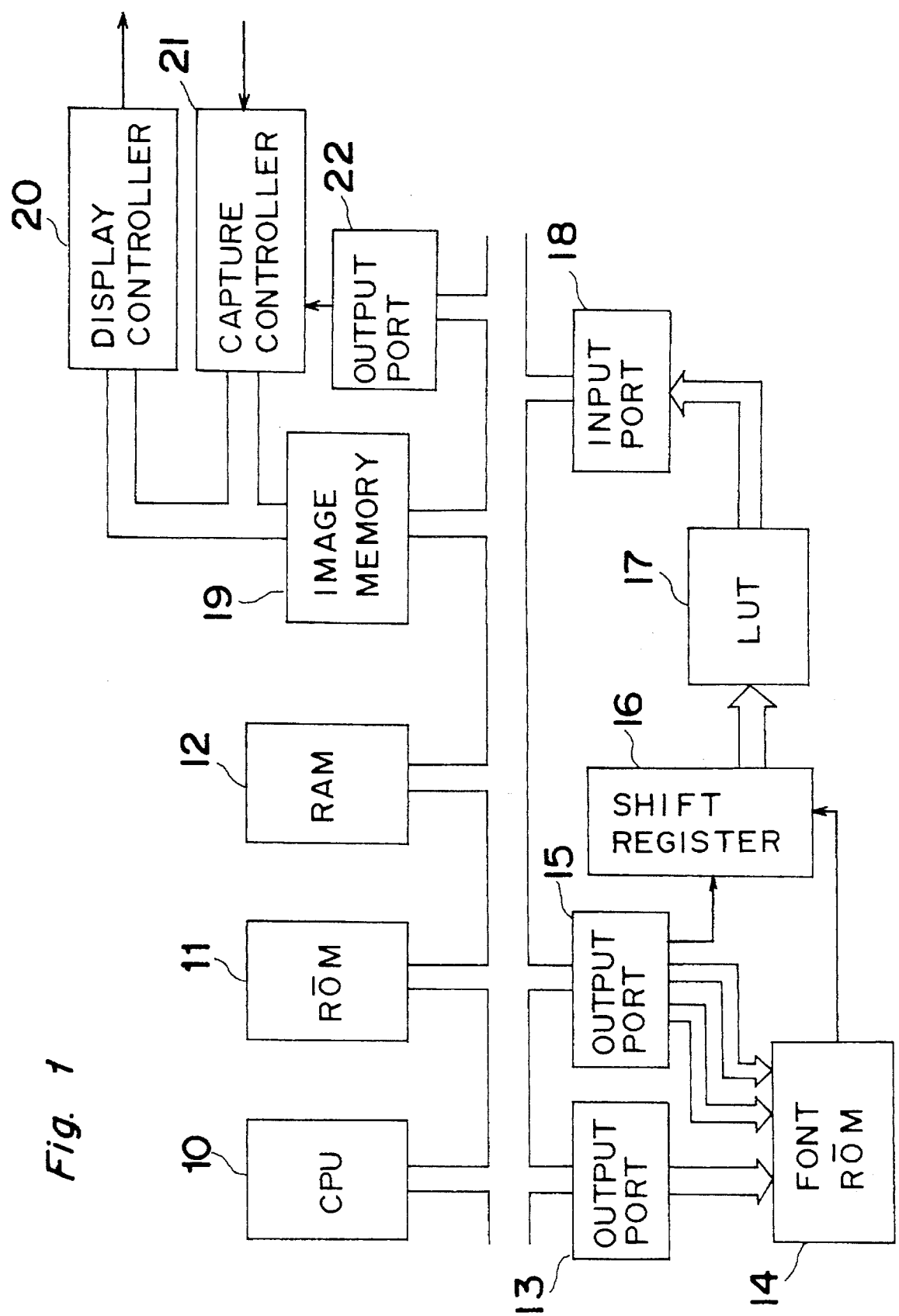
FIG. 1 is a block diagram showing an image data processing apparatus according to a first embodiment of the invention.

Referring to FIG. 1, a block diagram of an image data processing apparatus according to a first embodiment of the invention is shown. This image data processing apparatus inputs a full color image, character codes, and character colors to generate a text image of the specified color with smooth contour lines mixed with a full color image. This embodiment is described using a 3×3 pixel matrix-shaped area by way of example only.

The image data processing apparatus comprises a CPU 10, ROM 11, RAM 12, and, three output ports 13, 15 and 22. a dedicated font ROM 14, a shift register 16, a look-up table (LUT) 17, an input port 18, an image memory 19, a display controller 20, and a capture controller 21 are arranged, as shown in FIG. 1.

The CPU 10 is a microprocessor for controlling the image data processing apparatus and data processing. The ROM (read-only memory) 11 stored the CPU 10 program and data. The RAM (random access memory) 12 is used for temporary storage of the data processed by the CPU 10, character codes, and color data. The character codes stored in RAM 12 are output from output port 13. The font ROM 14 selects the character specified by the character code output from the output port 13, and output port 15 outputs the scan address of the bit image data corresponding to the character code selected by the font ROM 14. The shift register 16 converts the output serial signal from the font ROM 14 to a parallel signal. This parallel signal is input to the LUT 17 as the address of the density data to be output from the LUT 17. The input port 18 is used to read the density data output from the LUT 17.

The image memory 19 is used to store the full color data for display. The display controller 20 controls the image memory 19 read address to display the data, and the capture controller 21 controls the write address of the image memory 19 to which the image data is to be written. The third output port 22 outputs the read start timing signal for the capture controller 21.

In this embodiment, the data processing operation is performed by the hardware and ROM 11 described above, and the firmware (software) controlling the CPU 10 as described above.

Figure 2A:
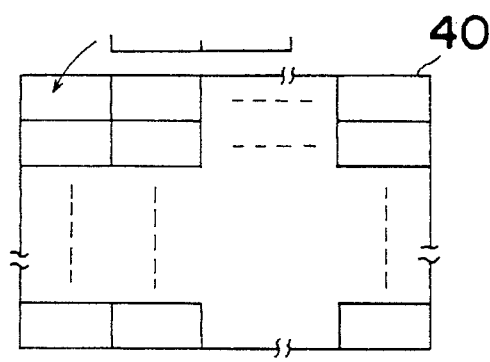
FIGS. 2A and 2B are graphs in assistance of explaining the concept of the character code storage area and character color storage area, respectively.

Referring to FIG. 2A, a conceptual illustration of a character code storage area 40 set by the software in the RAM 12 is shown. In this embodiment, the character codes are standard JIS (Japan Industrial Standard) codes, and the memory capacity is sufficient to provide two bytes per character as required by the JIS code system.

Figure 2B:
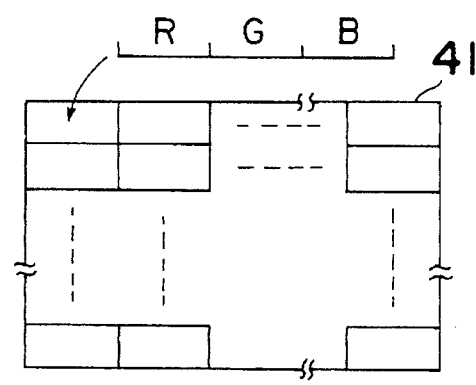

Referring to FIG. 2B, a conceptual illustration of the a character color storage area 41 set by the software in the RAM 12 is shown. The text color of the code at the address corresponding to the character code address in the character code storage area 40 is defined in standard full color RGB notation, requiring three bytes per character (one byte each for the red, green, and blue color values).

Figure 3A:
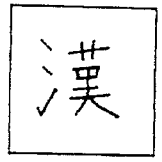
FIGS. 3A and 3B are graphs in assistance of explaining the internal structure of the font ROM having a bit-map image of a character.
Figure 3B:
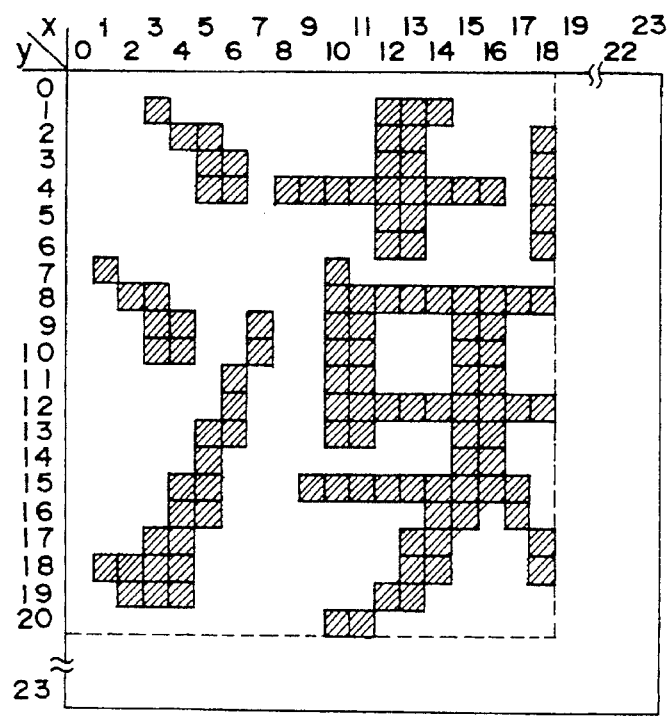

Referring to FIGS. 3A and 3B, a bit-map image of a character used to describe the internal structure of the font ROM 14.

Kanji according to the standard JIS code are stored in the font ROM 14 as bit images measuring 24×24 dots. Part of the bit image for the character KAN corresponding to JIS code 3441 (hexadecimal), representing a character of japanese kanji 漢, output by the font ROM 14 is shown in FIG. 3A. The character is stored using the values 1 and 0 for the shaded and unshaded dots in FIG. 3B, respectively.

The firmware and operation of this embodiment are described next.

Figure 4:
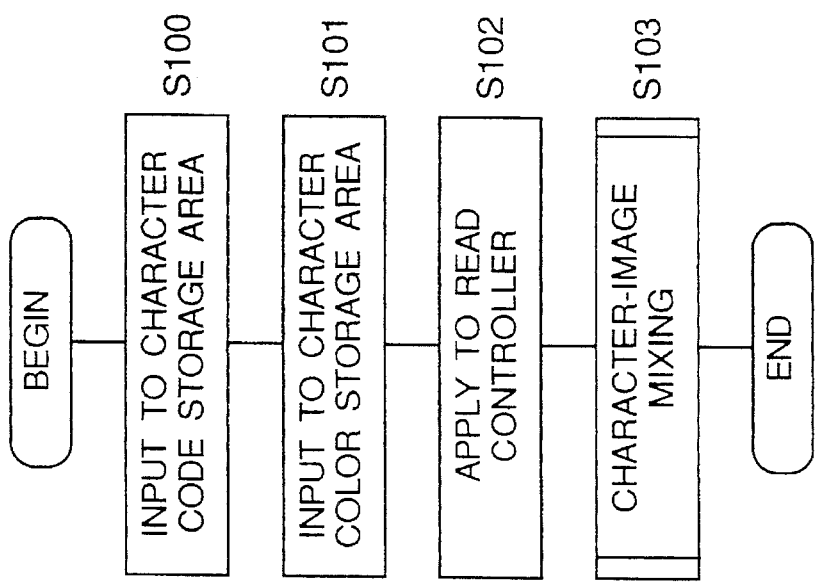
FIG. 4 is a flow chart showing the main operation performed by the image data processing apparatus of FIG. 1.

Referring to FIG. 4, a flow chart of the main routine of the firmware program according to the data processing apparatus according to the first embodiment of the present invention is shown. This routine has four processing steps as follows.

At step S100, JIS code of the target character to be mixed is input to the character code storage area 40.

At step S101, color information of the target character is input to the character color storage area 41.

At step S102, an instruction to read the full color information to the image memory 19 is applied to the capture controller 21 through the output port 22.

At step S103, the character-image mixing process whereby the character and image are mixed using the information set by the preceding three S100, S101, and S102 is performed. Then, the result of process is stored to the image memory 19.

Figure 5:
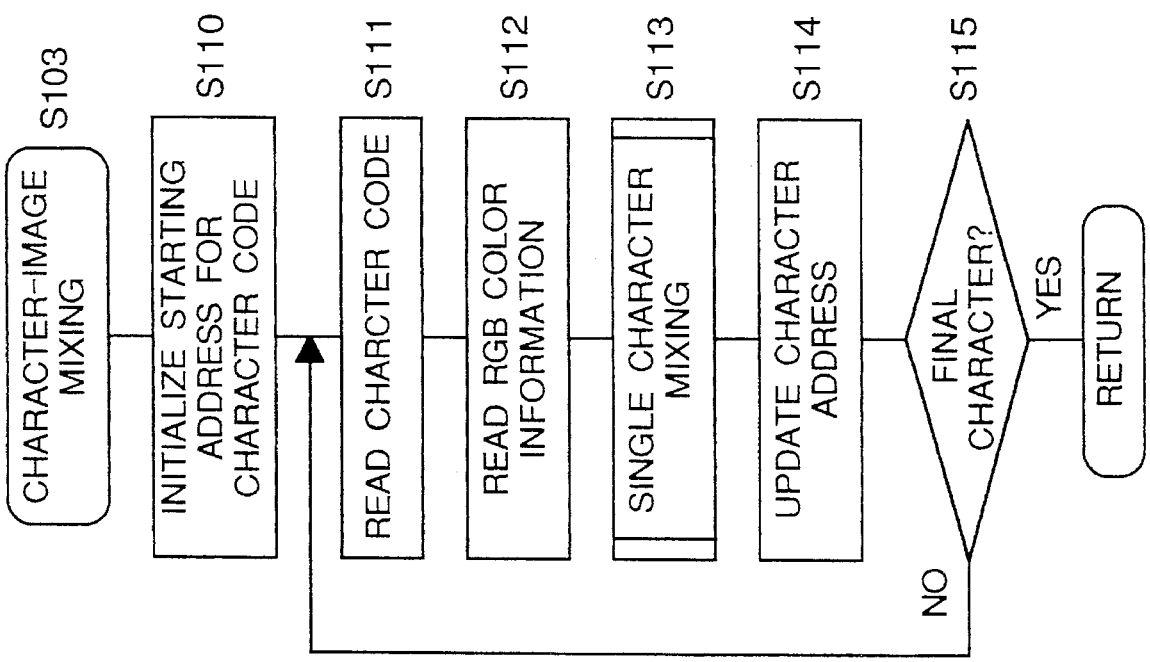
FIG. 5 is a flow chart showing the character image mixing process subroutine of FIG. 4.

Referring to FIG. 5, a flow chart showing the detailed operation of the character-image mixing step S103 is shown. This subroutine comprises six steps as follows.

At step S110, starting address for reading the character code and color information from the character code storage area 40 and character color storage area 41 is initialized. And, the starting position for character image mixing in the image memory 19 is initialized.

At step S111, JIS code for the single character is read out from the specified address in the character code storage area 40.

At step S112, the RGB color information for the one character is read out from the specified address in the character color storage area 41.

At step S113, mixing a single character defined by the information extracted in the preceding steps 111 and 112 with the contents of the image memory 19. The result of the mixing process is stored in the image memory 19.

At step S114, updating the character address in the character code storage area 40, the character address in the character code storage area 40, character color storage area 41, and image memory 19 are updated.

At step S115, it is judged whether these character-image mixing process is applied to all of the character information read by the main routine or not. Until this process is applied to the last character information, the process from steps S111 to S114 are repeated.

Figure 6:
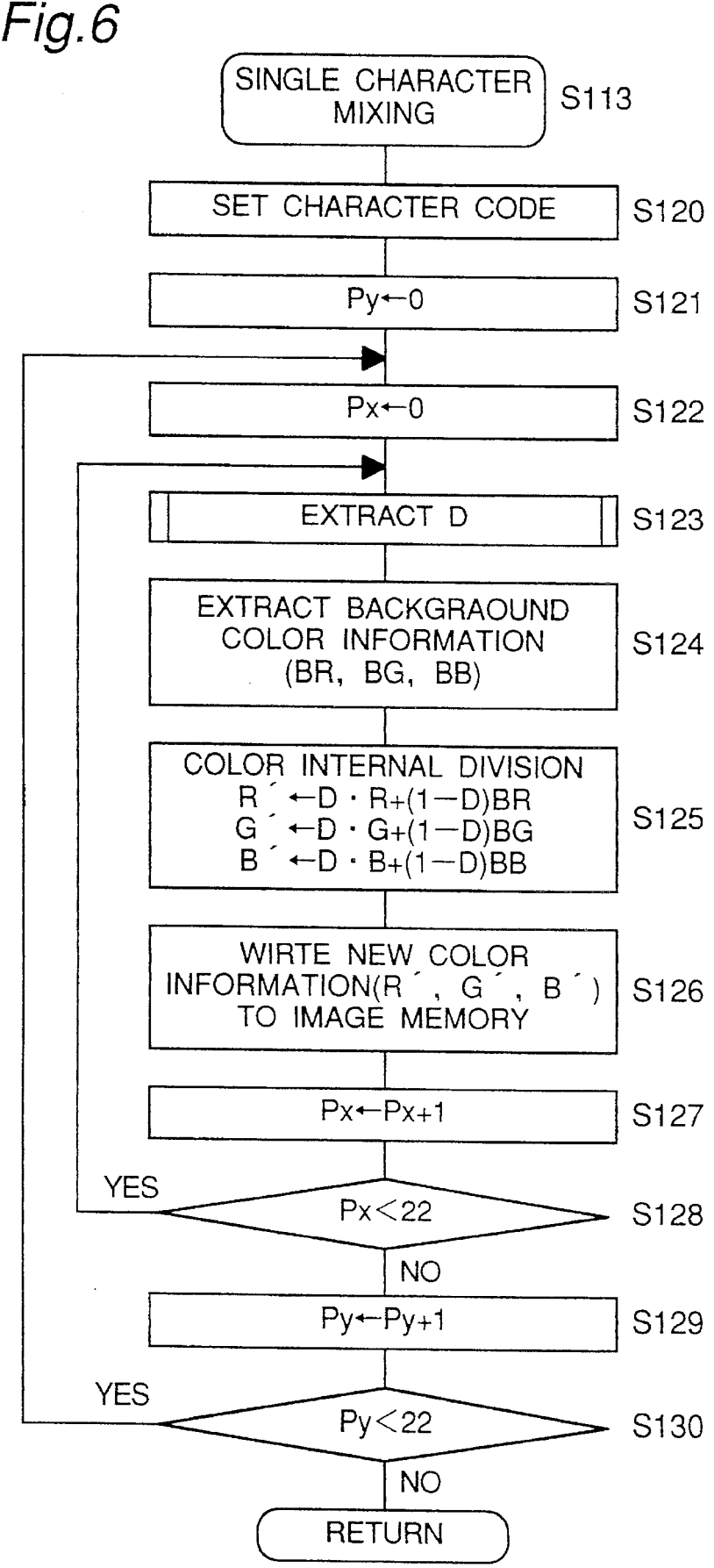
FIG. 6 is a flow chart showing the single character mixing process subroutine of FIG. 5.

Referring to FIG. 6, a flow chart showing the detailed operation of the single character mixing step S113 is shown.

This single character mixing step S113 is the subroutine whereby the single character is mixed with the image based on the JIS code and RGB color information obtained in the character image mixing process 103. This subroutine is applied to each dot in the character shown in FIG. 3.

At step S120, this subroutine starts with the character code setting process in which the JIS code is output through the output port 13 to set the high bit address in the font ROM 14.

At step S121, a first pointer Py which is indicative of Y-coordinate content of the dot to be applied with the mixing process is set to zero.

At step S122, similarly, a second pointer Px indicative of X-coordinate content is set to zero.

At step S123, the gradation density information D of the coordinates (Px, Py) in the selected character font are then extracted.

At step S124, the background color information BR, BG and BB of the position corresponding to the coordinates (Px, Py) is then extracted from the image memory 19.

At step S125, new color information R', G', and B' is then generated by internally dividing the character code information R, G, B and the background color information BR, BG, BB by the gradation density information D.

At step S126, the new color information R', G', and B' generated by the color internal division process is then written to the image memory 19.

At step S127, the X-coordinate content Px is incremented by one.

At step S128, it is judged whether the second pointer Px is smaller than a predetermined number of "22" or not. Since the second pointer Px was set to zero at step S122, it is judged as "YES" at this step S128, and the control returns to the step S123, so that the steps S123 to S128 are repeated until Px is incremented to 22 at the step S127. Thus, the single character mixing process is sequentially applied to dots defined by the X-coordinates from 0 to 21 on the same Y-coordinate.

At step S129, the first pointer Py is incremented by one.

At step S130, it is judged whether the first pointer Px is smaller than a predetermined number of "22" or not. Since the second pointer Py is set to zero at step S121, it is judged as "YES" at this step S130, and the control returns to the step S122, so that the steps S122 to S130 are repeated until the first pointer Py is incremented to 22 at the step S129. Dots defined by the Y-coordinates from 0 to 21 on the same X-coordinate are sequentially processed.

Although the font ROM 14 in this embodiment stores 24×24 dot bit-image characters, the data can be treated like a 22×22 bit image because the dots at the outside edges are all white (=0). The inside loop from step S123 to S 128 is therefore repeated 22 times for each value of first pointer Py while incrementing px each loop. When the inside loop is executed after incrementing Px to 22, the inside loop is exited, Py is incremented, Px is re-initialized to 0, and the inside loop is again repeated until Px=22. This subroutine is exited when both Py and Px equal 22. Thus, all dots on a 22×22 matrix are sequentially scanned and processed.

Figure 7:
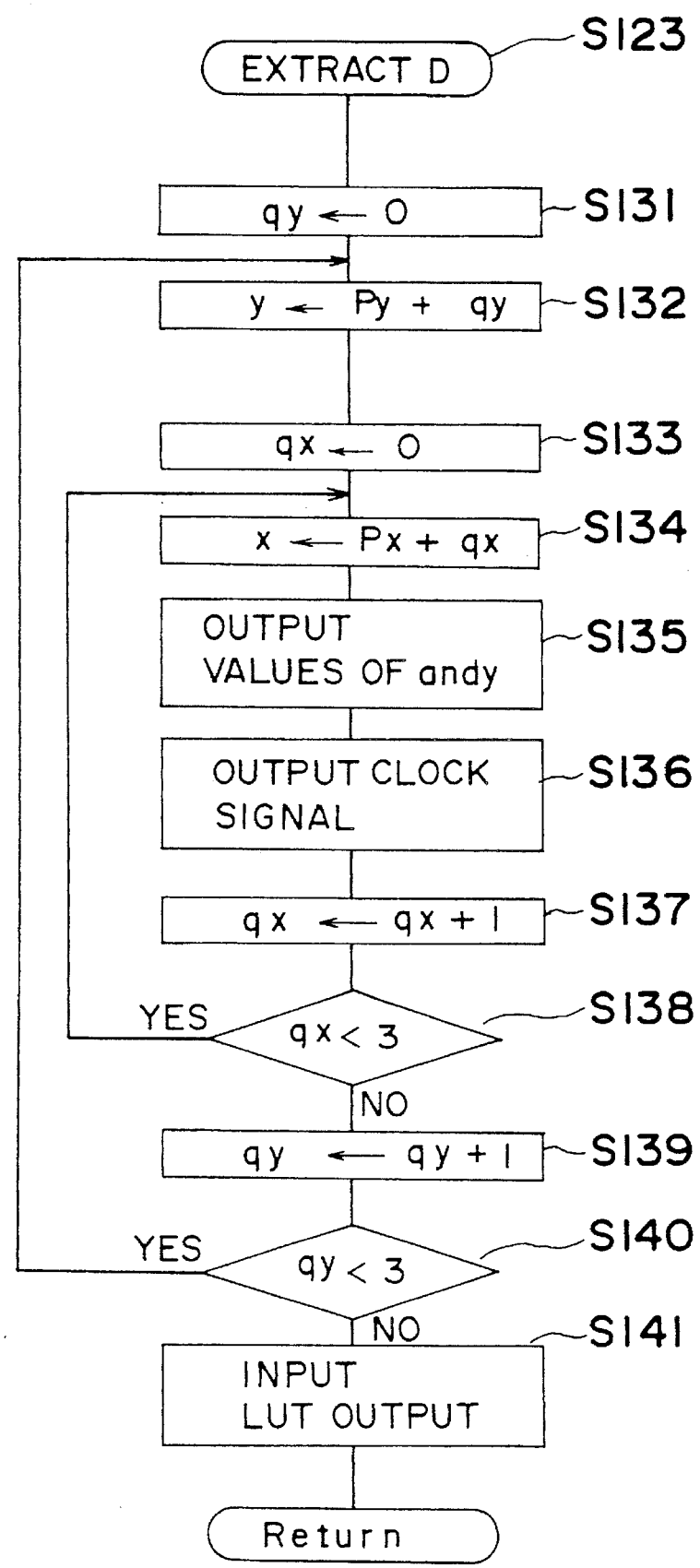
FIG. 7 is a flow chart showing the D-extraction process subroutine of FIG. 6.

Referring to FIG. 7, a flow chart showing the detailed operation of the step S123, at which the gradation density information D of the coordinates (Px, Py) in the selected character font are extracted, of FIG. 6 is shown.

First and second variables qy and qx, respectively corresponding to the Y-coordinate content and X-coordinate content, are used to hold the offset values for scanning a 3×3 matrix area for the coordinates (Px, Py). The values of qx and qy range from 0–2 each. Pointer X is the second pointer Px plus qx, and pointer y is the first point Py plus qy. The extraction process of step S123 thus extracts the matrix-shaped area by scanning the 3×3 matrix-shaped area referenced to top left coordinates (Px, Py) using the coordinates (x, y).

At step S131, the first variable qy is set to zero.

At step S132, the Y-coordinate y is set to sum of the first pointer Py plus the first variable qy.

At step S133, the second variable qx is set to zero.

At step S134, the X-coordinate x is set to sum of the second pointer Px plus the second variable qx. Thus, one dot is selected from one font in the font ROM 14 selected by the character code setting step S120 (FIG. 6).

At step S135, the values of pointers x and y are output to the output port 15.

At step S136, the clock signal is then output to the output port 15. The shift register 16 shifts the pixel data based on the clock signal.

At step S137, variable qx is incremented by one.

At step S138, it is judged whether variable qx is smaller than three or not. Until variable qx is incremented to 3 at the step S137, the control returns to the step S134, so that the steps S134 to S138 are repeated and three dots on the same Y-coordinate are scanned.

At step S139, variable qy is incremented by one.

At step S140, it is judged whether variable qy is smaller than three or not. Until variable qy is incremented to 3 at the step S139, the control returns to the step S132, so that the steps S132 to S140 are repeated and three dots on the same X-coordinate are scanned. Thus, 9-bit data arranged in the bit sequence determined by the scanning sequence of variables qx and qy is output.

At step S141, the LUT 17 output is read through the input port 18. The gradation density information D is read out from the LUT 17 using this 9-bit information as the look-up address.

As a result, the extraction routine S123 reads image data from the font ROM 14 nine times in a double loop for a single coordinate (Px, Py) by incrementing each of the variables qy and qx from 0–2 separately. This 9-bit pixel data covering the complete 3×3 matrix-shaped area is accumulated in the shift register 16, and the contents of the LUT 17 corresponding to the accumulated value is read from the input port 18.

The operation whereby the character color and background color are mixed using this density data is described below.

The color internal division process S125 (FIG. 6) performs an internal division operation for each color (red, green, and blue) using the equations shown in Equation [1] below. The extraction step S123 (FIG. 6) obtains the mixed colors R', G', and B' by internally dividing the character colors R, G, and B fetched from the character color storage area 41 by the RGB extraction step S112 (FIG. 5) and the background colors BR, BG, and BB extracted by the background color extraction step S124 (FIG. 6) using the fetched gradation density information D. Each of the thus obtained colors R', G', and B' is expressed by the following equation.

$$R' = D \times R + (1-D) \times BR \tag{1}$$

$$G' = D \times G + (1-D) \times BG \tag{2}$$

$$B'=D\times B+(1-D)\times BB \qquad (3)$$

The character mixing operation performed by this color internal division process at step S125 is described below assuming a character code of blue (R=0, G=0, B=255) and background color of gram (R=128, G=128, B=128), obtaining the mixed color (R', G', B').

If the gradation density information D obtained by the extraction process at step S123 is 0, the mixed color obtained by the equations (1), (2), and (3) will be the background color. If the gradation density information D is 1, the mixed color will be the character color, i.e., blue in the case of the equation (3).

If the gradation density information D is the intermediate level 0.5, the mixed color will be a light blue (R=64, G=64, B=191), and the intermediate level areas will blend naturally in with the background.

When this dot by dot mixing process is repeated 22×22 times, the single character mixing process at step S113 ends for one character. When the single character mixing process at the step S113 is executed once for each of the characters, the image data processing operation of the invention is completed.

The image resulting from this operation combines character(s) free of jagged line components mixed using the selected color into the background image read into the image memory 19 at the beginning of the operation, and is output to a CRT or other display device by the display controller 20.

The contents of the conversion table stored in the LUT 17 of the invention, and the method of determining the contents, are described below.

Referring to FIG. 8, an example of the LUT 17 contents is shown. The numbers in the figure are the element numbers from 0–511 expressed by a 9-bit word.

The 3×3 matrix beside each element number shows the peripheral pixels corresponding to the element number.

In the column of content 1, next to the matrix column, the density level output as the level of the middle pixel in the matrix for that pixel state is shown. It is to noted that this density level is the gradation density information D.

In the column of content 2, sub-pixel density data representing the density level output for the four sub-pixels are shown. These four sub-pixels (top left, top right, bottom left, bottom right) is produced from the center pixel by dividing the center pixel into two equal parts vertically and horizontally and interpolating thereof.

When enlarging 200% vertically and horizontally, the density data for the four pixels (a, b, c, and d) stored in Content 2 is output for each single reference to the LUT 17. Because the average of the four sub-pixels in Content 2 matches the density level D of Content 1, it is sufficient to store only Content 2 in the LUT 17 even when both same-size and enlarged outputs are required, and it is therefore not necessary to provide both D and four pixels density data.

Referring to FIGS. 9A, 9B, 9C, 10A, 10B, and 10C, the method of determining the content of each element in the conversion table is described below with reference to FIG. 9.

Figure 9A:
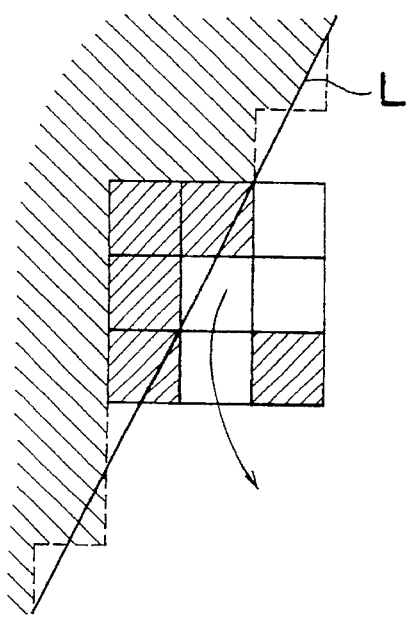
FIGS. 9A, 9B, and 9C are graphs in assistance of explaining the method of determining each element, with respect to one example pattern of input character, in the look-up table shown

In FIG. 9A, a 3×3 matrix pattern representing element number 331 in FIG. 8 (the binary value 101001011) is shown. Each of the shaded areas of matrix corresponds to 1 and non-shaded area to 0.

The first step is to estimate the effective normal contour line from the pixel positions. In this example, the area of the black (shaded) pixels is divided in two. Referring to the center target pixel, the influence of the black area on the left of the matrix pattern is strong because of the close proximity of the black area on the left, and the influence of the right-side area is relatively weak. Because of the stronger influence of the left-side area, a single contour line L is therefore projected.

As indicated by the estimated contour line L1 in FIG. 9A, this pixel pattern is assumed to continue outside this 3×3 matrix area, and the ratio of the black pixel area to the white pixel area is defined to be the same inside and outside this 3×3 matrix area.

Figure 9B:

In FIG. 9B, the target (center) pixel having block and white area divided by the estimated contour line L is shown. The area ratio inside the target pixel of the new black pixel area, which is based on the new contour line L1, covering the target pixel is stored in the conversion table as the density data D for element number 331.

Figure 9C:
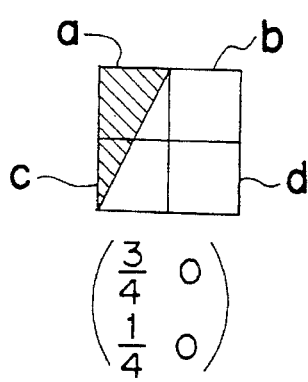

In FIG. 9C, the target pixel enlarged 200% enlarged vertically and horizontally is shown. The target pixel is divided into two equal parts vertically and horizontally, forming four interpolated sub-pixels a, b, c, and d. The ratio of the black to white area in each of these interpolated pixels a, b, c, and d are ¾, 0, ¼, and 0, respectively, and are therefore stored to the conversion table (FIG. 8) for element number 331.

Figure 10A:
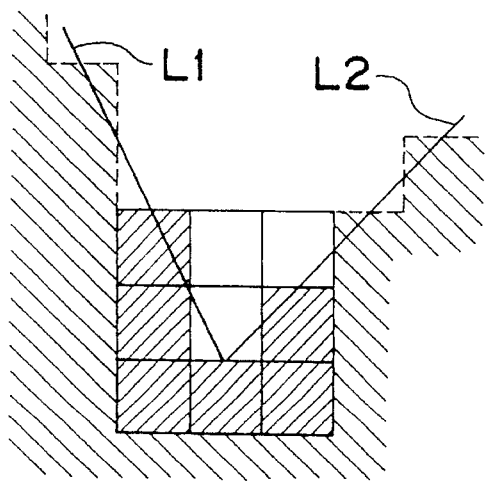

In FIG. 10A, another example of a 3×3 matrix pattern representing element number 489 (binary 111101001) is shown.

In this example it is determined that all of the black pixels affect the center (target) pixel, and two contour lines L1 and L2 are therefore projected instead of one line L in the case of FIG. 9A.

These contour lines L1 and L2 are projected using the same process as described above. It is assumed that the pixel pattern continues outside this matrix area, and the ratio of the black pixel area to the white pixel area is defined to be the same inside and outside this matrix area.

Figure 10B:

In FIG. 10B, the target pixeld with new contour lines L1 and L2 is shown. The new black-to-white area ratio in the target pixel is therefore stored in the conversion table as the density data for element number 489.

Figure 10C:
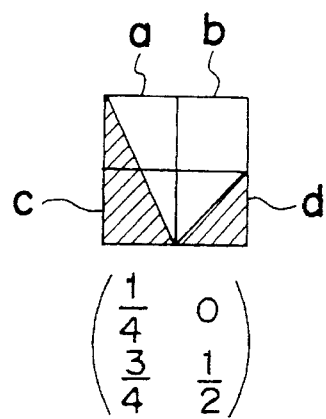

In FIG. 10C, the target pixel enlarged 200% enlarged vertically and horizontally is shown. The ratio of the black to white area in each of these interpolated pixels a, b, c, and d are ¼, 0, ¾, and ½, respectively, and are therefore stored to the conversion table (FIG. 8) for element number 489.

The method of estimating the contour lines described above is the basic means of determining the density data. Whether one or two contour lines are assumed for any given pixel pattern in the same matrix shape may vary according to the person compiling the conversion table. If there is a match between the actual font used and the 512 pixel patterns of this conversion table, the best contour line can statistically be estimated, and a conversion table obtaining the best performance from this invention can be compiled.

If the conversion table is compiled according to the above method, however, the effect of the invention will be sufficient even if there are slight differences. One example of conversion table compiled to 512 pixel patterns obtained by the above method is shown bellow in Table 1, in which the column A represents the element No. and column B represents values of sub-pixels a, b, c, and d, from the left to the right, respectively. Each of values for sub-pixels a, b, c, and d indicates values multiplied by four for sake of recognition. Therefore, actual density of sub-pixels are obtained by dividing each of these values by four. For example, if the value is 3 shown for the sub-pixel a, the sub-pixel a has the density of ¾. Since the density level D is the same as the average of the four sub-pixels a, b, c, and d, the density level D is not included in this table.

TABLE 1

| A | B |
|---|---|
| 0 | 0,0,0,0 |
| 1 | 0,0,0,0 |
| 2 | 0,0,0,0 |
| 3 | 0,0,0,0 |
| 4 | 0,0,0,0 |
| 5 | 0,0,0,0 |
| 6 | 0,0,0,0 |
| 7 | 0,0,0,0 |
| 8 | 0,0,0,0 |
| 9 | 0,0,0,0 |
| 10 | 0,0,0,0 |
| 11 | 2,0,0,0 |
| 12 | 0,0,0,0 |
| 13 | 0,0,0,0 |
| 14 | 0,0,0,0 |
| 15 | 3,1,0,0 |
| 16 | 4,4,4,4 |
| 17 | 4,4,4,4 |
| 18 | 4,4,4,4 |
| 19 | 4,4,2,4 |
| 20 | 4,4,4,4 |
| 21 | 4,4,4,4 |
| 22 | 4,4,4,2 |
| 23 | 4,4,2,2 |
| 24 | 4,4,4,4 |
| 25 | 4,2,4,4 |
| 26 | 4,4,4,4 |
| 27 | 4,4,4,4 |
| 28 | 4,4,4,4 |
| 29 | 4,2,4,4 |
| 30 | 4,4,3,1 |
| 31 | 4,4,3,1 |
| 32 | 0,0,0,0 |
| 33 | 0,0,0,0 |
| 34 | 0,0,0,0 |
| 35 | 0,0,0,0 |
| 36 | 0,0,0,0 |
| 37 | 0,0,0,0 |
| 38 | 0,2,0,0 |
| 39 | 1,3,0,0 |
| 40 | 0,0,0,0 |
| 41 | 0,0,0,0 |
| 42 | 0,0,0,0 |
| 43 | 2,0,0,0 |
| 44 | 0,0,0,0 |
| 45 | 0,0,0,0 |
| 46 | 0,2,0,0 |
| 47 | 2,2,0,0 |
| 48 | 4,4,4,4 |
| 49 | 4,4,4,4 |
| 50 | 4,4,4,4 |
| 51 | 4,4,1,3 |
| 52 | 2,4,4,4 |
| 53 | 2,4,4,4 |
| 54 | 4,4,4,4 |
| 55 | 4,4,1,3 |
| 56 | 4,4,4,4 |
| 57 | 4,4,4,4 |
| 58 | 4,4,4,4 |
| 59 | 4,4,4,4 |
| 60 | 4,4,4,4 |
| 61 | 4,4,4,4 |
| 62 | 4,4,4,4 |
| 63 | 4,4,4,4 |
| 64 | 0,0,0,0 |
| 65 | 0,0,0,0 |
| 66 | 0,0,0,0 |
| 67 | 0,0,0,0 |
| 68 | 0,0,0,0 |
| 69 | 0,0,0,0 |
| 70 | 0,0,0,0 |
| 71 | 0,0,0,0 |
| 72 | 0,0,0,0 |
| 73 | 0,0,0,0 |
| 74 | 0,0,0,0 |
| 75 | 3,0,1,0 |
| 76 | 0,0,0,0 |
| 77 | 0,0,0,0 |
| 78 | 0,0,0,0 |
| 79 | 0,0,0,0 |
| 80 | 4,4,4,4 |
| 81 | 4,4,4,4 |
| 82 | 4,4,4,4 |
| 83 | 4,4,2,4 |
| 84 | 4,4,4,4 |
| 85 | 4,4,4,4 |
| 86 | 4,4,4,2 |
| 87 | 4,4,4,4 |
| 88 | 4,4,4,2 |
| 89 | 4,2,4,2 |
| 90 | 4,3,4,1 |
| 91 | 4,3,4,1 |
| 92 | 4,4,4,2 |
| 93 | 4,4,4,4 |
| 94 | 4,4,4,2 |
| 95 | 4,4,4,2 |
| 96 | 0,0,0,0 |
| 97 | 0,0,0,0 |
| 98 | 0,0,0,0 |
| 99 | 0,0,0,0 |
| 100 | 0,0,0,0 |
| 101 | 0,0,0,0 |
| 102 | 0,2,0,0 |
| 103 | 1,3,0,0 |
| 104 | 0,0,0,0 |
| 105 | 0,0,0,0 |
| 106 | 0,0,0,0 |
| 107 | 3,0,1,0 |
| 108 | 0,0,0,0 |
| 109 | 0,0,0,0 |
| 110 | 0,2,0,0 |
| 111 | 3,2,1,0 |
| 112 | 4,4,4,4 |
| 113 | 4,4,4,4 |
| 114 | 4,4,4,4 |
| 115 | 4,4,1,3 |
| 116 | 2,4,4,4 |
| 117 | 4,4,4,4 |
| 118 | 4,4,4,4 |
| 119 | 4,4,1,3 |
| 120 | 4,4,4,4 |
| 121 | 4,4,4,4 |
| 122 | 4,4,4,4 |
| 123 | 4,4,4,4 |
| 124 | 4,4,4,4 |
| 125 | 4,4,4,4 |
| 126 | 4,4,4,4 |
| 127 | 4,4,4,4 |
| 128 | 0,0,0,0 |
| 129 | 0,0,0,0 |
| 130 | 0,0,0,0 |
| 131 | 0,0,0,0 |
| 132 | 0,0,0,0 |
| 133 | 0,0,0,0 |
| 134 | 0,0,0,0 |
| 135 | 0,0,0,0 |
| 136 | 0,0,0,0 |
| 137 | 0,0,0,0 |
| 138 | 0,0,0,0 |
| 139 | 2,0,0,0 |
| 140 | 0,0,0,0 |
| 141 | 0,0,0,0 |
| 142 | 0,0,0,0 |
| 143 | 3,1,0,0 |
| 144 | 4,4,4,4 |
| 145 | 4,4,4,4 |
| 146 | 4,4,4,4 |
| 147 | 4,4,4,4 |
| 148 | 4,4,4,4 |
| 149 | 4,4,4,4 |
| 150 | 4,4,4,4 |
| 151 | 4,4,4,4 |
| 152 | 4,4,4,4 |
| 153 | 4,2,4,4 |

TABLE 1-continued

| A | B |
|---|---|
| 154 | 4,4,4,4 |
| 155 | 4,4,4,4 |
| 156 | 4,4,4,4 |
| 157 | 4,4,4,4 |
| 158 | 4,4,4,4 |
| 159 | 4,4,4,4 |
| 160 | 0,0,0,0 |
| 161 | 0,0,0,0 |
| 162 | 0,0,0,0 |
| 163 | 0,0,0,0 |
| 164 | 0,0,0,0 |
| 165 | 0,0,0,0 |
| 166 | 0,2,0,0 |
| 167 | 1,3,0,0 |
| 168 | 0,0,0,0 |
| 169 | 0,0,0,0 |
| 170 | 0,0,0,0 |
| 171 | 0,0,0,0 |
| 172 | 0,0,0,0 |
| 173 | 0,0,0,0 |
| 174 | 0,0,0,0 |
| 175 | 0,0,0,0 |
| 176 | 4,4,4,4 |
| 177 | 4,4,4,4 |
| 178 | 4,4,4,4 |
| 179 | 4,4,4,4 |
| 180 | 1,4,3,4 |
| 181 | 1,4,3,4 |
| 182 | 4,4,4,4 |
| 183 | 4,4,4,4 |
| 184 | 4,4,4,4 |
| 185 | 4,4,4,4 |
| 186 | 4,4,4,4 |
| 187 | 4,4,4,4 |
| 188 | 4,4,4,4 |
| 189 | 4,4,4,4 |
| 190 | 4,4,4,4 |
| 191 | 4,4,4,4 |
| 192 | 0,0,0,0 |
| 193 | 0,0,0,0 |
| 194 | 0,0,0,0 |
| 195 | 0,0,0,0 |
| 196 | 0,0,0,0 |
| 197 | 0,0,0,0 |
| 198 | 0,0,0,0 |
| 199 | 0,0,0,0 |
| 200 | 0,0,2,0 |
| 201 | 1,0,3,0 |
| 202 | 0,0,2,0 |
| 203 | 2,0,2,0 |
| 204 | 0,0,2,0 |
| 205 | 1,0,3,0 |
| 206 | 0,0,2,0 |
| 207 | 3,1,2,0 |
| 208 | 2,4,4,4 |
| 209 | 2,4,4,4 |
| 210 | 4,4,4,4 |
| 211 | 4,4,4,4 |
| 212 | 2,4,4,4 |
| 213 | 4,4,4,4 |
| 214 | 4,4,4,4 |
| 215 | 4,4,4,4 |
| 216 | 4,4,4,4 |
| 217 | 3,0,4,1 |
| 218 | 4,4,4,4 |
| 219 | 4,4,4,4 |
| 220 | 4,4,4,4 |
| 221 | 4,1,4,3 |
| 222 | 4,4,4,4 |
| 223 | 4,4,4,4 |
| 224 | 0,0,0,0 |
| 225 | 0,0,0,0 |
| 226 | 0,0,0,0 |
| 227 | 0,0,0,0 |
| 228 | 0,0,0,0 |
| 229 | 0,0,0,0 |
| 230 | 0,2,0,0 |
| 231 | 1,3,0,0 |
| 232 | 0,0,2,0 |
| 233 | 1,0,3,0 |
| 234 | 0,0,0,0 |
| 235 | 0,0,0,0 |
| 236 | 0,0,2,0 |
| 237 | 1,0,3,0 |
| 238 | 0,0,0,0 |
| 239 | 2,2,2,0 |
| 240 | 1,3,4,4 |
| 241 | 1,3,4,4 |
| 242 | 4,4,4,4 |
| 243 | 4,4,4,4 |
| 244 | 2,4,4,4 |
| 245 | 2,4,4,4 |
| 246 | 4,4,4,4 |
| 247 | 4,4,4,4 |
| 248 | 4,4,4,4 |
| 249 | 4,4,4,4 |
| 250 | 4,4,4,4 |
| 251 | 4,4,4,4 |
| 252 | 4,4,4,4 |
| 253 | 4,4,4,4 |
| 254 | 4,4,4,4 |
| 255 | 4,4,4,4 |
| 256 | 0,0,0,0 |
| 257 | 0,0,0,0 |
| 258 | 0,0,0,0 |
| 259 | 0,0,0,0 |
| 260 | 0,0,0,0 |
| 261 | 0,0,0,0 |
| 262 | 0,0,0,0 |
| 263 | 0,0,0,0 |
| 264 | 0,0,0,0 |
| 265 | 0,0,0,0 |
| 266 | 0,0,0,0 |
| 267 | 2,0,0,0 |
| 268 | 0,0,0,0 |
| 269 | 0,0,0,0 |
| 270 | 0,0,0,0 |
| 271 | 3,1,0,0 |
| 272 | 4,4,4,4 |
| 273 | 4,4,4,4 |
| 274 | 4,4,4,4 |
| 275 | 4,4,2,4 |
| 276 | 4,4,4,4 |
| 277 | 4,4,4,4 |
| 278 | 4,4,4,2 |
| 279 | 4,4,4,4 |
| 280 | 4,4,4,4 |
| 281 | 4,2,4,4 |
| 282 | 4,4,4,4 |
| 283 | 4,4,4,4 |
| 284 | 4,4,4,4 |
| 285 | 4,4,4,4 |
| 286 | 4,4,3,1 |
| 287 | 4,4,3,1 |
| 288 | 0,0,0,0 |
| 289 | 0,0,0,0 |
| 290 | 0,0,0,0 |
| 291 | 0,0,0,0 |
| 292 | 0,0,0,0 |
| 293 | 0,0,0,0 |
| 294 | 0,3,0,1 |
| 295 | 0,0,0,0 |
| 296 | 0,0,0,0 |
| 297 | 0,0,0,0 |
| 298 | 0,0,0,0 |
| 299 | 2,0,0,0 |
| 300 | 0,0,0,0 |
| 301 | 0,0,0,0 |
| 302 | 0,3,0,1 |
| 303 | 2,3,0,1 |
| 304 | 4,4,2,4 |
| 305 | 4,4,2,4 |
| 306 | 3,4,1,4 |
| 307 | 4,4,2,4 |

TABLE 1-continued

| A | B |
|---|---|
| 308 | 2,4,2,4 |
| 309 | 4,4,4,4 |
| 310 | 3,4,1,4 |
| 311 | 4,4,2,4 |
| 312 | 4,4,4,4 |
| 313 | 4,4,4,4 |
| 314 | 4,4,4,4 |
| 315 | 4,4,4,4 |
| 316 | 4,4,4,4 |
| 317 | 4,4,4,4 |
| 318 | 4,4,4,4 |
| 319 | 4,4,4,4 |
| 320 | 0,0,0,0 |
| 321 | 0,0,0,0 |
| 322 | 0,0,0,0 |
| 323 | 0,0,0,0 |
| 324 | 0,0,0,0 |
| 325 | 0,0,0,0 |
| 326 | 0,0,0,0 |
| 327 | 0,0,0,0 |
| 328 | 0,0,0,0 |
| 329 | 0,0,0,0 |
| 330 | 0,0,0,0 |
| 331 | 3,0,1,0 |
| 332 | 0,0,0,0 |
| 333 | 0,0,0,0 |
| 334 | 0,0,0,0 |
| 335 | 0,0,0,0 |
| 336 | 4,4,4,4 |
| 337 | 4,4,4,4 |
| 338 | 4,4,4,4 |
| 339 | 4,4,4,4 |
| 340 | 4,4,4,4 |
| 341 | 4,4,4,4 |
| 342 | 4,4,4,4 |
| 343 | 4,4,4,4 |
| 344 | 4,4,4,2 |
| 345 | 4,4,4,4 |
| 346 | 4,3,4,1 |
| 347 | 4,3,4,1 |
| 348 | 4,4,4,4 |
| 349 | 4,4,4,4 |
| 350 | 4,4,4,2 |
| 351 | 4,4,4,2 |
| 352 | 0,0,0,0 |
| 353 | 0,0,0,0 |
| 354 | 0,0,0,0 |
| 355 | 0,0,0,0 |
| 356 | 0,0,0,0 |
| 357 | 0,0,0,0 |
| 358 | 0,3,0,1 |
| 359 | 0,0,0,0 |
| 360 | 0,0,0,0 |
| 361 | 0,0,0,0 |
| 362 | 0,0,0,0 |
| 363 | 3,0,1,0 |
| 364 | 0,0,0,0 |
| 365 | 0,0,0,0 |
| 366 | 0,3,0,1 |
| 367 | 3,3,1,1 |
| 368 | 4,4,2,4 |
| 369 | 4,4,4,4 |
| 370 | 3,4,1,4 |
| 371 | 4,4,2,4 |
| 372 | 4,4,4,4 |
| 373 | 4,4,4,4 |
| 374 | 3,4,1,4 |
| 375 | 4,4,2,4 |
| 376 | 4,4,4,4 |
| 377 | 4,4,4,4 |
| 378 | 4,4,4,4 |
| 379 | 4,4,4,4 |
| 380 | 4,4,4,4 |
| 381 | 4,4,4,4 |
| 382 | 4,4,4,4 |
| 383 | 4,4,4,4 |
| 384 | 0,0,0,0 |
| 385 | 0,0,0,0 |
| 386 | 0,0,0,0 |
| 387 | 0,0,0,0 |
| 388 | 0,0,0,0 |
| 389 | 0,0,0,0 |
| 390 | 0,0,0,0 |
| 391 | 0,0,0,0 |
| 392 | 0,0,0,0 |
| 393 | 0,0,0,0 |
| 394 | 0,0,0,0 |
| 395 | 2,0,0,0 |
| 396 | 0,0,0,0 |
| 397 | 0,0,0,0 |
| 398 | 0,0,0,0 |
| 399 | 3,1,0,0 |
| 400 | 4,2,4,4 |
| 401 | 4,2,4,4 |
| 402 | 4,4,4,4 |
| 403 | 4,4,4,4 |
| 404 | 4,2,4,4 |
| 405 | 4,4,4,4 |
| 406 | 4,4,4,4 |
| 407 | 4,4,4,4 |
| 408 | 3,1,4,4 |
| 409 | 4,2,4,4 |
| 410 | 4,4,4,4 |
| 411 | 4,4,4,4 |
| 412 | 3,1,4,4 |
| 413 | 4,2,4,4 |
| 414 | 4,4,4,4 |
| 415 | 4,4,4,4 |
| 416 | 0,0,0,2 |
| 417 | 0,0,0,2 |
| 418 | 0,0,0,2 |
| 419 | 0,0,0,2 |
| 420 | 0,1,0,3 |
| 421 | 0,1,0,3 |
| 422 | 0,2,0,2 |
| 423 | 1,3,0,2 |
| 424 | 0,0,0,2 |
| 425 | 0,0,0,2 |
| 426 | 0,0,0,0 |
| 427 | 0,0,0,0 |
| 428 | 0,1,0,3 |
| 429 | 0,1,0,3 |
| 430 | 0,0,0,0 |
| 431 | 2,2,0,2 |
| 432 | 4,4,4,4 |
| 433 | 4,4,4,4 |
| 434 | 4,4,4,4 |
| 435 | 4,4,4,4 |
| 436 | 1,4,3,4 |
| 437 | 1,4,3,4 |
| 438 | 4,4,4,4 |
| 439 | 4,4,4,4 |
| 440 | 4,4,4,4 |
| 441 | 4,4,4,4 |
| 442 | 4,4,4,4 |
| 443 | 4,4,4,4 |
| 444 | 4,4,4,4 |
| 445 | 4,4,4,4 |
| 446 | 4,4,4,4 |
| 447 | 4,4,4,4 |
| 448 | 0,0,0,0 |
| 449 | 0,0,0,0 |
| 450 | 0,0,0,0 |
| 451 | 0,0,0,0 |
| 452 | 0,0,0,0 |
| 453 | 0,0,0,0 |
| 454 | 0,0,0,0 |
| 455 | 0,0,0,0 |
| 456 | 0,0,3,1 |
| 457 | 0,0,0,0 |
| 458 | 0,0,3,1 |
| 459 | 2,0,3,1 |
| 460 | 0,0,3,1 |
| 461 | 0,0,0,0 |

TABLE 1-continued

| A | B |
| --- | --- |
| 462 | 0,0,3,1 |
| 463 | 3,1,3,1 |
| 464 | 2,2,4,4 |
| 465 | 4,4,4,4 |
| 466 | 4,4,4,4 |
| 467 | 4,4,4,4 |
| 468 | 4,4,4,4 |
| 469 | 4,4,4,4 |
| 470 | 4,4,4,4 |
| 471 | 4,4,4,4 |
| 472 | 3,1,4,4 |
| 473 | 4,2,4,4 |
| 474 | 4,4,4,4 |
| 475 | 4,4,4,4 |
| 476 | 4,4,4,4 |
| 477 | 4,2,4,4 |
| 478 | 4,4,4,4 |
| 479 | 4,4,4,4 |
| 480 | 0,0,1,3 |
| 481 | 0,0,1,3 |
| 482 | 0,0,1,3 |
| 483 | 0,0,1,3 |
| 484 | 0,0,0,0 |
| 485 | 0,0,0,0 |
| 486 | 0,2,1,3 |
| 487 | 1,3,1,3 |
| 488 | 0,0,2,2 |
| 489 | 1,0,3,2 |
| 490 | 0,0,0,0 |
| 491 | 2,0,2,2 |
| 492 | 0,1,2,3 |
| 493 | 1,1,3,3 |
| 494 | 0,2,2,2 |
| 495 | 0,0,0,0 |
| 496 | 1,3,4,4 |
| 497 | 1,3,4,4 |
| 498 | 4,4,4,4 |
| 499 | 4,4,4,4 |
| 500 | 2,4,4,4 |
| 501 | 2,4,4,4 |
| 502 | 4,4,4,4 |
| 503 | 4,4,4,4 |
| 504 | 4,4,4,4 |
| 505 | 4,4,4,4 |
| 506 | 4,4,4,4 |
| 507 | 4,4,4,4 |
| 508 | 4,4,4,4 |
| 509 | 4,4,4,4 |
| 510 | 4,4,4,4 |
| 511 | 4,4,4,4 |

An alternative embodiment of an image data processing apparatus according to the present invention is described below.

Figure 11:
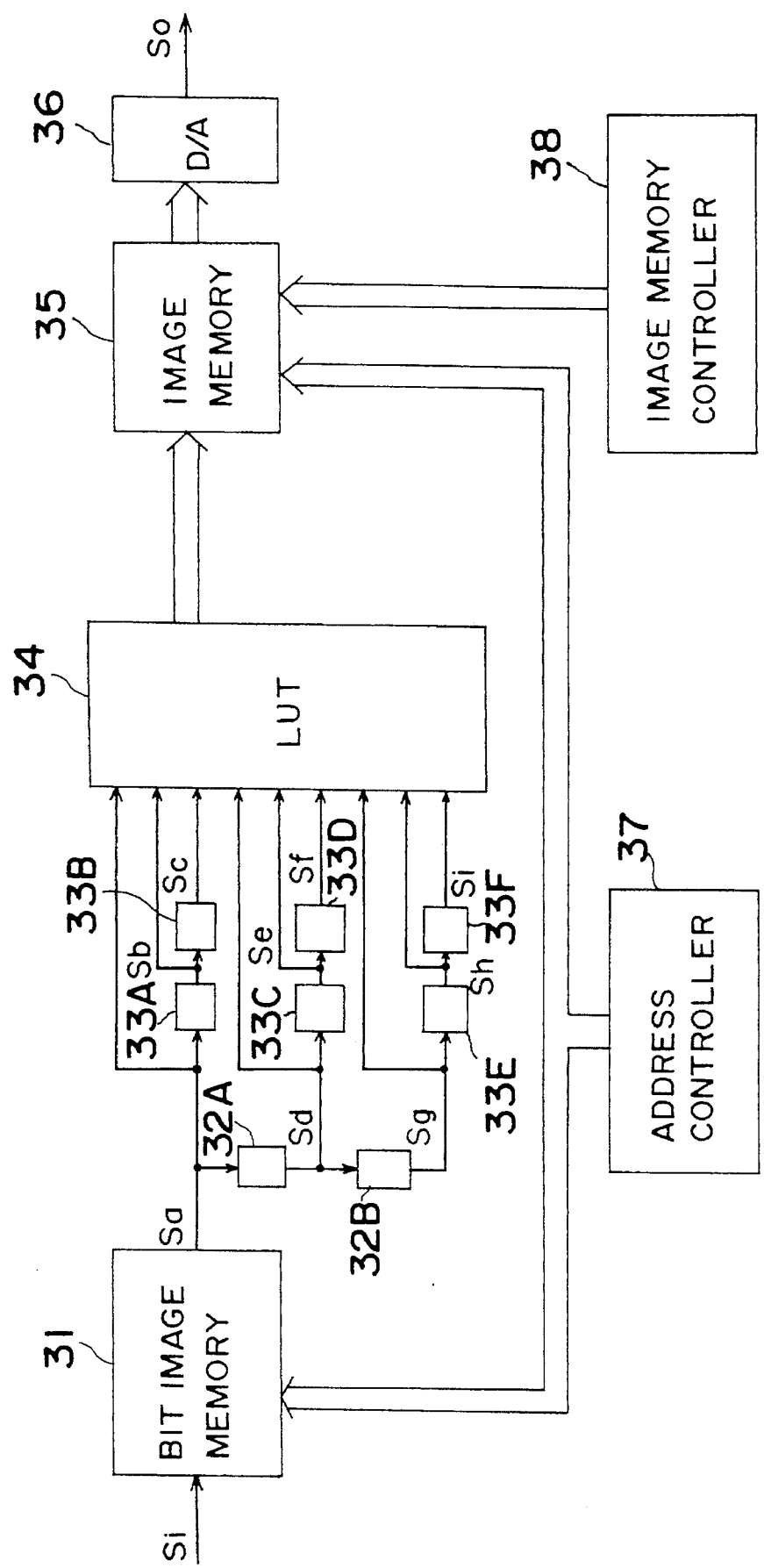
FIG. 11 is a block diagram of an image data processing apparatus according to a second embodiment of the present invention.

Referring to FIG. 11, a block diagram of an image data processing apparatus according to a second embodiment of the present invention is shown. This image data processing apparatus can provide improved smoothness of diagonal lines in the input bit image, and displaying the result.

The image data processing apparatus includes a bit image memory 31 for storing the bit image data Si. Line delays 32A and 32B are provided for delaying the bit stream serially output from the bit image memory 31 by one line. Pixel delays 33A to 33F are provided for delaying the same bit stream by one pixel each. The outputs from the line delays 32A, 32B and the pixel delays 33A–33F are input as the look-up address to a look-up table (LUT) 34, which outputs the referenced gradation levels. The LUT 34 output is stored an the multiple value image memory 35. The output from the image memory 35 is then converted to an analog value and output as a video signal So by a digital-analog (D/A) converter 36. The bit image memory 31 read address and image memory 35 write address are controlled by an address controller 37. Regulated by the video signal timing, a display address controller 38 generates the address for reading the image memory 35 output and outputting the video signal from the D/A converter 36.

The digital image signal, which may be read in by an image scanner or stored externally, and the bit image signal generated, for example, by the font ROM are input to the bit image memory 31. The line delays 32A, 32B and pixel delays 33A–33F function to extract the 3×3 matrix-shaped areas from the bit stream signal output from the bit image memory 31, and to arrange the input data into a form that can be used to address the LUT 34.

This data processing apparatus is applied to the high definition display of black-and-white binary bit image data such as obtained by facsimile transmission on a gray scale display or video printer.

In operation, the binary data stored in the bit image memory 31 is read out as a serial bit stream (pixel signal a) at a specified timing based on the address controller 37. This pixel signal Sa is delayed one and two lines, respectively, by the line delays 32A, 32B, resulting in pixel signals Sd and Sg, respectively. The resulting pixel signals Sa, Sd, and Sg equivalent to three image lines are then delayed one and two pixels by the pixel delays 33A and 33B, 33C and 33D, and 33E and 33F, resulting in three pixels for each line being input to the LUT 34.

Figure 12:
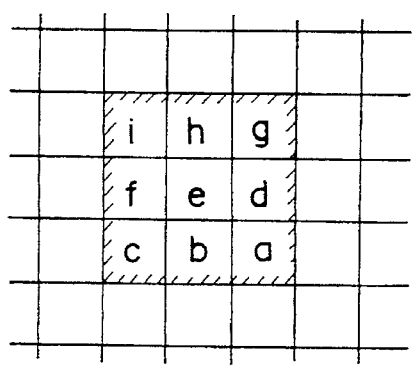
FIG. 12 is a graph in assistance of explaining the pixel placement in the matrix-shaped area according to the present invention.

The pixel signals Sa to Si for these nine pixels a, b, c, d, e, f, g, h, and i which are arranged in a 3×3 matrix as shown in FIG. 12, effectively extracting a matrix-shaped area from the bit image memory 31.

By linking the pixel signals Sa to Si for the extracted pixels so that signal Sa is the most-significant bit (MSB) and the signal Si is the least-significant (LSB), the 3×3 matrix-shaped area is arranged in the predetermined bit sequence, and is input as a 9-bit address to the LUT 34. Because this entire sequence is executed in parallel and synchronized to the timing signal generated by the address controller 37, the matrix-shaped area extracted each time the pixel signal Sa is output from the bit image memory 31 shifts one pixel to the right, and the LUT 34 outputs the gradation density data for one pixel, or four pixels when the image is enlarged, at each step.

The same timing is used by the address controller 37 to output the address for writing the one or four pixel density data output from the LUT 34 to the image memory 35. Once the density data processed for each of the pixels in the bit image memory 31 is written to the image memory 35, the image memory 35 outputs the density data synchronized to the display timing output from the display address controller 38. The density data is converted to an analog video signal by the D/A converter 36, and output thereby to the display device.

The contents of the LUT 34 in this embodiment are described above.

As described above, the content of the LUT 17 in the previous embodiment is as shown in FIG. 8 and Table 1, and the ratio of the new black area in the target pixel area obtained by the method shown in FIGS. 9A to 10C is used as the density data. This density data is then used to determine the internal division ratio between two color data.

In this second embodiment, however, this density data is used to directly control the CRT or other display device, and conversion to a brightness signal is necessary. The data stored in the LUT 34 is therefore the gamma-corrected data.

The bit image data is input to this data processing apparatus using values of 0 (for white pixels) and 1 (for black pixels), the inverse of the binary video signal values used to drive the CRT.

In the method according to the present invention, however, a hypothetical diagonal line is set within the area of a single pixel, and the gradation density data is calculated based the new ratio of black to white area resulting from this hypothetical diagonal line. If this density data is output directly as the video signal, the density of the light observed by the eye will be different from the original bit image input to the bit image memory 31, and this diagonal lines interpolated into the image will not be visually perceived.

This is described below using the image shown in FIG. 9A displayed on a CRT. A CRT normally has a gamma value of approximately 2.2. The luminous energy Le (where $0 \leq Le \leq 1$) emitted by the CRT for an analog brightness signal Bs (where $0 \leq Bs \leq 1$) is $Le=Bs^{2.2}$.

If the center target pixel is hypothetically reproduced on a super-high resolution CRT assuming a precise diagonal line defined by the values $Bs_0$ (black) and $Bs_1$ (white) as shown in FIG. 9A, the average luminous energy L emitted by the target pixel will be strictly proportional to the ratio of the light emitting area to the total area of the target pixel. If the ratio of the black area in the target pixel is Ab (where $0 \leq Ab \leq 1$), the luminous energy Le will be $$Le=(1-Ab) \times Bs_1^{2.2}+Ab \times Bs_0^{2.2}$$

Because $Bs_0$ and $Bs_1$ are the inverse of the input bit image data, $Bs_0=0$ and $Bs_1=1$, the gamma value will have no affect, and the luminous energy Le will be $$Le=1-Bs.$$

In this embodiment, however, the luminous energy Le for an analog brightness signal Bs output from the D/A converter 36 will be $$Le=Bs^{2.2}$$

Therefore, if both luminous energy Le values are matched, the luminous energy emitted by the target pixels will be equal, and the interpolated diagonal line will be visually perceptible as a smooth contour line. Note that it is preferable for the value of the analog brightness signal Bs to be $$Bs=(1-Ab)^{0.45}.$$

Figure 13:
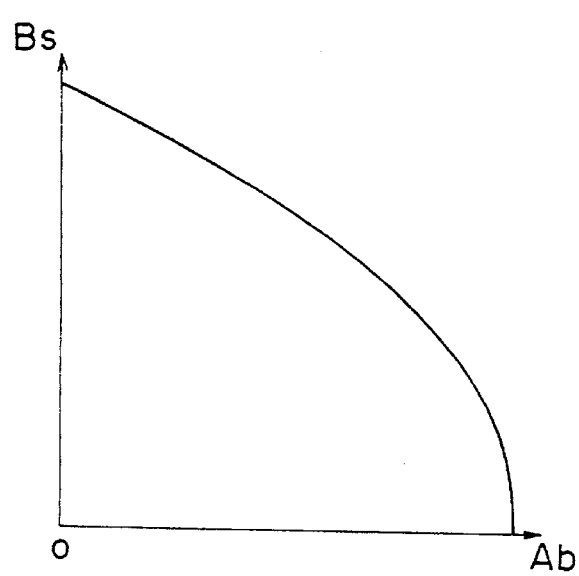
FIG. 13 is a graph showing of the gamma correction characteristics.

This relationship is illustrated in FIG. 12. The values of the area ratio Ab gamma-corrected by the characteristic shown in FIG. 13 are therefore stored in the LUT 34.

As thus described, gamma correction is still necessary when binary image data displayed on a CRT is processed by an image data processing apparatus according to the invention for display back to the CRT.

While the primary objective of gamma correction is as described above, a variety of gamma characteristics will be preferably provided to enable correction of the many non-linear factors affecting the luminous energy of the image before it is perceived by the eye, including the CRT brightness and contrast adjustment, dot gain caused by the CRT beam or printer dot bleeding, and reflection of ambient light from the CRT surface.

It is thus possible to reproduce using gradation a hypothetical diagonal line that is visually perceived as a smooth diagonal line.

Figure 14:
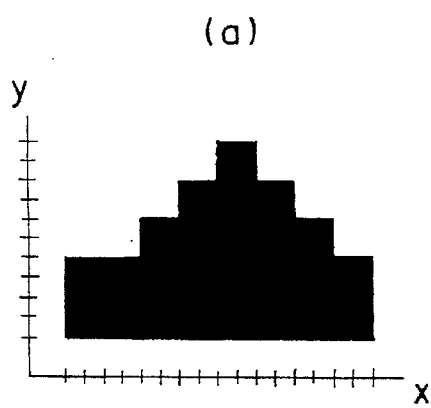
FIGS. 14A and 14B are graphs in assistance of explaining the process results of the image data processing apparatus according to the present invention.
Figure 14:
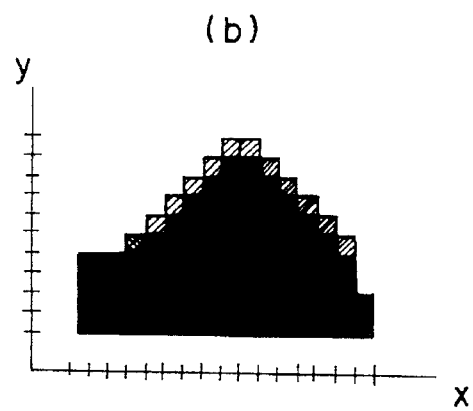

Referring to FIGS. 14A and 14B, the result output by the image data processing apparatus according to the present invention is shown. Part of a line component in a relatively high dot density (56×56) font enlarged two times vertically and horizontally is shown. This line component is characteristic of the right end line component of horizontal lines in a mincho-style Japanese font (comparable to a Roman serif font such as Times in English). The full line from which this component is extracted can be seen at the top right corner of the character, for example, 涙 shown in FIGS. 3A and 3B.

In FIG. 14A, the font enlarged two times vertically and horizontally with no smoothing is shown.

In FIG. 14B, the same component similarly enlarged by an image data processing apparatus according to the invention.

While the jagged lines resulting from un-enhanced enlargement are conspicuous in FIG. 14A, the high dot density after enlargement is effectively combined with gradation to achieve a relatively smooth diagonal line contour as shown in FIG. 14B. Because gradation does not appear in the contours of horizontal and vertical lines, the resulting character remains sharp with very little blurring.

It is to be noted that while the output device of the invention is described above as being a CRT, it can also be a video printer or other hard-copy output device capable of gray-scale output by applying ink to paper or other medium.

Furthermore, the above embodiments are described using bit-mapped fonts, but the same effect can be obtained with outline or outline fonts used to dynamically generate bit images.

The present invention thus described can interpolate the normal contour lines from low pixel density input data, compensate for error in the interpolated hypothetical contour line using gradation, and reproduce images that appear smooth and free of jagged line components on a low resolution display. This effect can also be obtained with images enlarged N times vertically and horizontally to output visually smooth images.

Images and characters featuring sharp definition, little overall blurring, and extremely smooth diagonal lines in comparison with methods that remove jagged line contours by blurring the contours with a filter can also be displayed because the present invention operates selectively on diagonal line components subject to jagged contours and does not generate intermediate tone contours for vertical and horizontal line components, which are free of jagged contours.

By outputting density data with gamma correction applied to the estimated area ratio, the visual smoothness obtained by a gradation display can be exhibited with greatest effectiveness.

Using a set text color and a set background color or a background color extracted from a second color image, it is also possible to produce color images with smooth text contours, or mix color text with a second color image.

In addition to effectively eliminating obvious jagged line components from bit-mapped fonts, the present invention can also be effectively applied to bit images generated from outline or outline fonts to reproduce text with minimal jaggedness. While the effect of this process is also obtained on such image displaying devices such as CRT, LCD, and other display devices having lower resultion compared with the page printers. However, it is particularly noticeable when viewed on CRT, LCD, and other display devices capable of displaying variable gradations.

Although the present invention has been fully described in connection with the preferred embodiments thereof with reference to the accompanying drawings, it is to be noted that various changes and modifications are apparent to those skilled in the art. Such changes and modifications are to be understood as included within the scope of the present invention as defined by the appended claims unless they depart therefrom.

What is claimed is:

1. An image data processing apparatus for generating multilevel data values from bit-map image data values corresponding to respective pixels, each of said pixels having a respective binary level and including four sub-areas, each of said four sub-areas corresponding to a respective sub-pixel, said apparatus comprising:

data memory means for storing said bit-map image data values;

locating means for locating a 3×3 matrix of ones of said bit-map image data values stored in said data memory;

arranging means for arranging said bit-map image data in a linear arrangement to produce a binary data value having a $3^2$ bit numeric value;

conversion table means having $2^{3\times 3}$ elements addressed by said $3^2$ bit numeric value from said arranging means for:

a) producing a multilevel data value corresponding to a target pixel which is located at the center of said 3×3 matrix, each one of said $2^{3\times 3}$ elements including a set of density data values arranged in a 2×2 matrix in a predetermined order wherein said density data values are calculated from the percentage of black area of said sub-area of each of said sub-pixels which is estimated based on one or more main contour lines which is predicted from the positions of black pixels in the matrix-shaped area, said sub-pixels being 2×2 sub-divisions of pixel area of said target pixel; and b) outputting a respective second density data value enlarged two times vertically and horizontally as each of said density data values; and output means for outputting said multilevel data value as a new center pixel which replaces said target pixel to enhance gradation of said bit-map image data.

* * * * *